(12) United States Patent
Vrba et al.

(10) Patent No.: US 12,371,079 B2
(45) Date of Patent: Jul. 29, 2025

(54) VEHICLE SPEED MANAGEMENT SYSTEMS AND METHODS

(71) Applicant: Westinghouse Air Brake Technologies Corporation, Wilmerding, PA (US)

(72) Inventors: Matthew Vrba, Marion, IA (US); Jeffrey Kernwein, Cedar Rapids, IA (US)

(73) Assignee: Westinghouse Air Brake Technologies Corporation, Pittsburgh, PA (US)

( * ) Notice: Subject to any disclaimer, the term of this patent is extended or adjusted under 35 U.S.C. 154(b) by 320 days.

(21) Appl. No.: 18/123,082

(22) Filed: Mar. 17, 2023

(65) Prior Publication Data

US 2023/0227082 A1    Jul. 20, 2023

Related U.S. Application Data

(63) Continuation-in-part of application No. 16/728,753, filed on Dec. 27, 2019, now Pat. No. 11,628,837.

(51) Int. Cl.
*G06N 3/00*     (2023.01)
*B61L 25/02*    (2006.01)
(Continued)

(52) U.S. Cl.
CPC .............. *B61L 25/021* (2013.01); *G06N 3/08* (2013.01); *G06V 10/82* (2022.01); *B61L 2201/00* (2013.01)

(58) Field of Classification Search
CPC .............. B61L 25/021; B61L 2201/00; B61L 15/0062; B61L 23/041; G06N 3/08;
(Continued)

(56) References Cited

U.S. PATENT DOCUMENTS 10,318,821 B2    6/2019  Kim et al.
11,628,837 B2    4/2023  Vrba et al.
(Continued)

FOREIGN PATENT DOCUMENTS

CA       3102494 C      1/2024
MX       412638         4/2024

OTHER PUBLICATIONS

Office Action mailed Jan. 20, 2023 for corresponding Canadian Patent Application No. 3102494 (3 pages).
(Continued)

*Primary Examiner* — Ian Jen
(74) *Attorney, Agent, or Firm* — K&L Gates LLP

(57) ABSTRACT

A method is provided that may include obtaining image data from vision sensors disposed onboard a vehicle. The method may include determining a stopping distance of the vehicle based at least in part on the image data using an artificial intelligence (AI) neural network having artificial neurons arranged in layers and connected with each other by connections. A moving speed and a speed limit of the vehicle may be determined using the AI neural network. The method may control movement of the vehicle using the AI neural network by enforcing movement authorities preventing unwarranted movement of the vehicle based on a difference between the moving speed and the speed limit. The method may include receiving feedback regarding the stopping distance and the speed limit calculated by the artificial neurons and training the AI neural network by changing connections between the artificial neurons based on the feedback received.

20 Claims, 6 Drawing Sheets

(51) Int. Cl.
*G06N 3/08* (2023.01)
*G06V 10/82* (2022.01)

(58) Field of Classification Search
CPC .... G06N 3/0442; G06N 3/0464; G06V 10/82; G06V 20/56; B60W 2520/10; B60W 2555/60; B60W 2720/10; B60W 60/0015; H04L 67/12; G06T 2207/10016; G06T 2207/10028; G06T 2207/30204; G06T 7/00; G06T 7/536
See application file for complete search history.

(56) References Cited

U.S. PATENT DOCUMENTS

| | | |
|---|---|---|
| 2016/0191886 A1 | 6/2016 | Tanabe et al. |
| 2019/0291726 A1 | 9/2019 | Shalev-Shwartz et al. |
| 2019/0291728 A1 | 9/2019 | Shalev-Shwartz et al. |
| 2019/0299984 A1 | 10/2019 | Shalev-Shwartz et al. |
| 2019/0337509 A1 | 11/2019 | Shalev-Shwartz et al. |
| 2019/0384294 A1 | 12/2019 | Shashua et al. |
| 2019/0384295 A1 | 12/2019 | Shashua et al. |
| 2019/0384296 A1 | 12/2019 | Shashua et al. |
| 2020/0079368 A1* | 3/2020 | Yamada ................. G08G 1/166 |

OTHER PUBLICATIONS

PickPik "Royalty-Free photo: gleise, railway, seemed, railroad tracks, rail traffic, upper lines, loneliness, fog, catenary, morning hour, photo" https://www.pickpik.com/gleise-railway-seemed-railroad-tracks-rail-traffic-upper-lines-33896 (28) pages.

* cited by examiner

VEHICLE SPEED MANAGEMENT SYSTEMS AND METHODS

CROSS-REFERENCE TO RELATED APPLICATIONS

This application is a continuation-in-part of U.S. patent application Ser. No. 16/728,753, filed 27 Dec. 2019, and the entire disclosure of which is incorporated herein by reference.

BACKGROUND

Technical Field

The subject matter described herein relates to methods and systems for managing speed of a vehicle.

Discussion of Art

Vehicles in a vehicle network can operate according to automated safety systems that stop or slow down operations of the vehicles in certain locations. These systems may rely on databases that associate different locations of routes being traveled upon by the vehicles with different speed limits. Additionally or alternatively, the systems can communicate a maximum restricted speed in response to any static or dynamic condition associated with portions of the pathways presenting an increased risk to the safety of the vehicles in the vehicle network. Many types of events can increase the risk to vehicles, but may not require stopping the vehicles from moving within the vehicle network. For example, events occurring within the vehicle network (e.g., signaled pathways, occupied portions of the pathways, vehicles not controlled by the vehicle network on portions of the pathways, etc.) can cause the automated safety systems to communicate a maximum restricted speed to the vehicles in portions of the vehicle network. If the vehicles travel in excess of these limits, then the systems may communicate signals to the vehicles that slow or stop the vehicles. Conventional systems employ predefined and static speed limits for different locations of routes. The predefined and static speed limits may not account for factors such as geography, weather conditions, and vehicle state information (e.g., length, mass, height, consist). However, many vehicle networks may provide for or allow a dynamic restricted speed based on geography, weather conditions, and vehicle state information. In one example, the Federal Railroad Administration defines restricted speed to mean a speed that will permit a train or other equipment to stop within one-half the range of vision of the person operating the train or other equipment, but not exceeding 20 miles per hour, unless further restricted by the operating rules of the railroad. As a result, the systems may permit vehicles to travel in excess of or below the restricted speeds when geography, weather conditions, and vehicle state information are accounted for. This can pose a safety risk.

It may be desirable to have a system and method that differs from those that are currently available.

BRIEF DESCRIPTION

In one embodiment, a method is provided that may include obtaining image data from one or more vision sensors disposed onboard a vehicle. The method may determine a stopping distance of the vehicle based at least in part on the image data from the vehicle using an artificial intelligence (AI) neural network having artificial neurons arranged in layers and connected with each other by connections. The method may determine a moving speed of the vehicle and a speed limit of the vehicle using the AI neural network. The speed limit may be determined based on the stopping distance that may be determined from the image data from the vehicle. The method may include controlling movement of the vehicle using the AI neural network by enforcing one or more movement authorities preventing unwarranted movement of the vehicle into one or more pathways based on a difference between the moving speed of the vehicle and the speed limit of the vehicle. The method may include receiving feedback regarding the stopping distance and the speed limit that may be calculated by the artificial neurons. The method may include training the AI neural network by changing one or more connections between the artificial neurons in the AI neural network based on the feedback that may be received.

In one embodiment, a system is provided that may include includes one or more vision sensors disposed onboard a vehicle and an AI neural network having artificial neurons arranged in layers and connected with each other by connections. The AI neural network may obtain image data from the one or more vision sensors and may determine a stopping distance of the vehicle based at least in part on the image data from the vehicle. The AI neural network may determine a moving speed of the vehicle and a speed limit of the vehicle. The speed limit may be determined based on the stopping distance that is determined by the AI neural network from the image data from the vehicle. The AI neural network may control movement of the vehicle by enforcing one or more movement authorities preventing unwarranted movement of the vehicle into one or more pathways based on a difference between the moving speed of the vehicle and the speed limit of the vehicle. The AI neural network may receive feedback regarding the stopping distance that may be calculated by the artificial neurons. The AI neural network may be trained by changing one or more connections between the artificial neurons in the AI neural network based on the feedback that may be received.

In one embodiment, a method is provided that may include obtaining image data from one or more vision sensors disposed onboard a vehicle. The one or more vision sensors may include one or more forward-facing vision sensors. The method may include determining a range of vision from the vehicle based at least in part on the image data using an AI neural network having artificial neurons arranged in layers and connected with each other by connections. The method may include determining a stopping distance of the vehicle based at least in part on the image data from the vehicle and the range of vision using the AI neural network. The method may include determining a moving speed of the vehicle and a speed limit of the vehicle using the AI neural network. The speed limit may be determined based on the stopping distance and the range of vision that are determined from the image data from the vehicle. The method may include controlling movement of the vehicle using the AI neural network by enforcing one or more movement authorities preventing unwarranted movement of the vehicle into one or more pathways based on a difference between the moving speed of the vehicle and the speed limit of the vehicle. The method may include receiving feedback regarding the stopping distance and the speed limit that may be calculated by the artificial neurons. The method may include training the AI neural network by changing one or more connections between the artificial neurons in the AI neural network based on the feedback that may be received.

BRIEF DESCRIPTION OF THE DRAWINGS

The present inventive subject matter will be better understood from reading the following description of non-limiting embodiments, with reference to the attached drawings, wherein below.

DETAILED DESCRIPTION

One or more embodiments described herein may provide for systems and methods that may generate signals to control movement of a vehicle based on differences between the moving speeds and speed limits of the vehicle. The systems and methods may control movement of the vehicle based at least in part on a detected and/or estimated range of vision of a vehicle operator. The systems and methods can obtain image data from one or more vision sensors disposed onboard the vehicle. The image data can be analyzed, alone or with other data, to determine a stopping distance of the vehicle. In one example, the data may be analyzed by an artificial intelligence (AI) or machine learning system to determine the stopping distance of the vehicle. The stopping distance can be utilized to determine one or more of a moving speed of the vehicle and/or a speed limit of the vehicle. The speed limit can be determined based on the stopping distance that is determined from the image data. The systems and methods generate signals to control movement of the vehicle based on differences between the moving speed of the vehicle and the speed limit of the vehicle. The systems and methods improve speed management in vehicle networks by managing the speed of individual vehicles in a manner that accounts for the range of vision of the vehicle operator to reduce the occurrence of collisions and/or enhance the safety of vehicles in the vehicle network.

One or more embodiments described herein may allow for implementation of dynamic speed control and/or management based at least in part on the range of vision of the vehicle operator and, optionally, factors such as one or more of geography, weather conditions, or vehicle state information (e.g., length, mass, height, consist, etc.). Implementation of dynamic speed control and/or management can enhance the safety of vehicles and vehicle systems by limiting vehicle speed that may allow the vehicle to stop in time to avoid a collision with another vehicle or object or fouled or damaged pathways. In one example, implementation of dynamic speed control as part of a restricted speed policy on a vehicle network may reduce the number of accidents of vehicles on a vehicle network and/or increase the safety of vehicles on a vehicle network.

Figure 1:
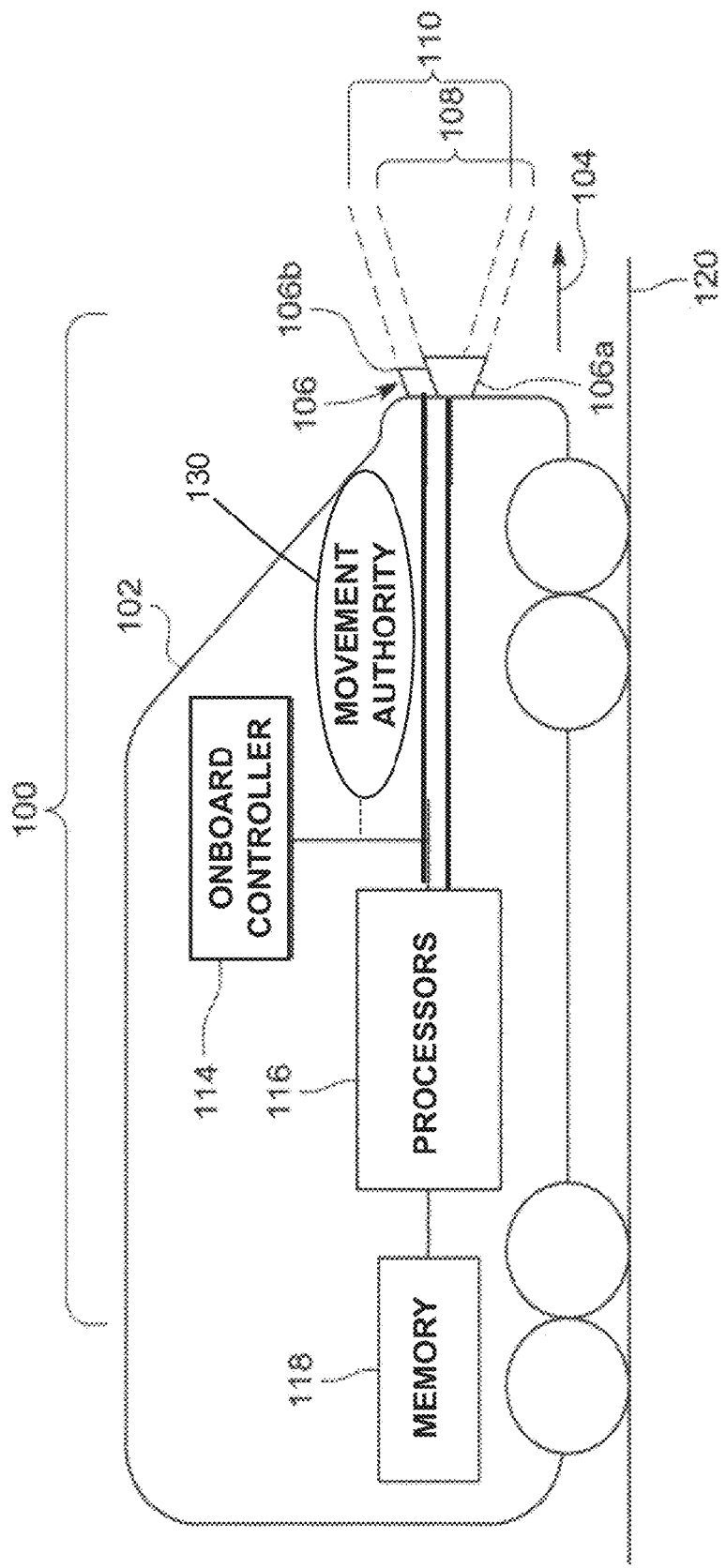
FIG. 1 illustrates an example of a system for managing a speed of a vehicle in accordance with one or more embodiments described herein.

FIG. 1 illustrates an example of a control system 100 for managing a speed of a vehicle in accordance with one or more embodiments described herein. The control system can be disposed onboard a vehicle 102. The term "vehicle" shall refer to any system for transporting or carrying one or more passengers and/or cargo. Types of vehicles may include automobiles, trucks, buses, rail vehicles (e.g., one or more locomotives and/or one or more rail cars), agricultural vehicles, mining vehicles, aircraft, industrial vehicles, marine vessels, automated and semi-automated vehicles, autonomous and semi-autonomous vehicles, and the like. The vehicle can be connected with one or more other vehicles logically and/or mechanically, such as one or more locomotives connected with one or more rail cars, to form at least part of a consist. The term "consist," or "vehicle consist," refers to two or more vehicles or items of mobile equipment that are mechanically or logically coupled to each other. By logically coupled, the plural items of mobile equipment vehicles that communicate with each other to coordinate their movements to that the vehicles move together as a vehicle system (e.g., a convoy). In an example of a mechanically coupled consist, the vehicle can be capable of propulsion to pull and/or push additional vehicles or other mobile equipment, either capable or incapable of propulsion, carrying passengers and/or cargo (e.g., a train or other system of vehicles).

In accordance with one or more embodiments described herein, an on-board controller 114 can implement a control system (e.g., a positive control system, negative control system, or other system). The control system may include one or more onboard processors 116. The onboard processors may include and/or represents one or more hardware circuits or circuitry that includes and/or is coupled with one or more computer processors (e.g., microprocessors) or other electronic logic-based devices. The control system implemented by the onboard controller can be positioned in a cabin of a vehicle (e.g., in an automobile, in a lead vehicle of a consist) and can monitor the location and movement of the vehicle within a vehicle network. The terms "vehicle network" and "vehicle control network" shall refer to a control network implemented among one or more vehicles and/or one or more wayside communications modules in a vehicle network. Vehicle networks are capable of communicating and/or implementing one or more of positive controls, negative controls, open loop controls, closed loop controls, or the like. Vehicle networks may be used to manage one or more of vehicles, types of vehicles, modes of transport, traffic on ways, and the like associated with the vehicle network. Vehicle networks may manage pathways designed for one or more types of vehicles. Additionally or alternatively, vehicle networks may manage pathways designed for different types of vehicles. A vehicle network may exist in a static or dynamic geographic domain or among a select vehicle population. A vehicle network may also be formed on an ad-hoc basis between a plurality of vehicles. Non-limiting examples of vehicle control include vehicular ad hoc networks, positive train control networks, industrial autonomous vehicle networks, and the like.

In accordance with one or more embodiments herein, the control system can be a positive control system, a negative control system, or any other type of control system. In some examples, the control system can enforce travel restrictions including movement authorities 130 that prevent unwarranted movement of the vehicle into certain route segments. Additionally or alternatively, the control system can allow the vehicle to enter certain route segments unless or until a signal from an off-board controller tells the vehicle to not enter into the segment. Based on travel information generated by the vehicle network and/or received through a communications module (not shown), the control system can determine the location of the vehicle, how fast the vehicle can travel based on any travel restrictions, and, based on movement enforcement being performed, adjust the speed of the vehicle. The travel information can include travel restriction information, such as movement authorities and speed limits, which can be dependent on a vehicle network zone and/or a pathway. As an example, the control system may provide commands to the propulsion system of the vehicle and, optionally, to propulsion systems of one or more additional trailing vehicles, to slow or stop the vehicle (or consist) in order to comply with a dynamic speed restriction or a movement authority. It will be appreciated that the onboard controller may also implement, in addition to or in lieu of positive controls, one or more of negative controls, open loop controls, closed loop controls, or the like without departing from the scope of the subject matter discussed herein. Additionally, the control system may include and/or incorporate AI or machine learning systems to provide travel information, travel restrictions, commands, or the like.

The system may include one or more vision sensors 106 (e.g., vision sensors 106a, 106b) mounted or otherwise operably coupled with the vehicle so that the vision sensors may move with the vehicle along a pathway. The term "pathway" shall mean any road or other way on land, air, or water, including all public and private roads, tracks, and routes, regardless of any entity responsible for maintenance of the way (e.g., a private entity, a state entity, a provincial entity, a county entity, an international entity, or the like).

The vision sensors may be visual (e.g., conventional cameras) and/or non-visual sensors (e.g., infrared sensors, Light Detection and Ranging (LIDAR) sensors, sonar sensors, radar systems, and the like). The vision sensors may be forward facing vision sensors in that the vision sensors may be oriented toward a direction of travel or movement 104 of the vehicle. For example, fields of view 108, 110 of the vision sensors may represent the space that may be captured in image data obtained by the vision sensors. In the illustrated example, the vision sensors may be forward facing in that the fields of view capture image data of the space in front of the vehicle. The vision sensors can obtain static (e.g., still) image data and/or moving image data (e.g., video). Optionally, one or more of the vision sensors may be disposed inside the vehicle. For example, the vehicle may include a cab vision sensor disposed inside an operator cab of the vehicle. A vision sensor disposed inside the vehicle can obtain image data through a window or other aperture of the vehicle.

The vision sensors can be capable of obtaining image data of the pathway while the vehicle may be moving up to and at relatively fast speeds. For example, the image data may be obtained while the vehicle is moving at or near an upper speed limit of the pathway, such as the speed limit of the pathway when maintenance is not being performed on the pathway or when the upper speed limit of the pathway has not been reduced.

The vision sensors operate based on signals received from the onboard processors. The onboard processors may activate the vision sensors to cause the vision sensors to obtain image data, optionally including a time stamp associated with the image data. This image data represents image data of the fields of view of the vision sensors, such as image data of one or more portions or segments of the pathway disposed ahead of the vehicle. The onboard processors can change the frame rate of the vision sensors (e.g., the speed or frequency at which the vision sensors obtain image data).

One or more processors of the system may examine the image data obtained by one or more of the vision sensors. For example, the onboard controller can include hardware and/or circuitry that includes and/or is coupled with one or more processors (e.g., computer processors, digital signal processors, microcontrollers, systems on a chip, etc.). In one aspect, the processors may examine the image data by identifying which portions of the image data represent the pathway and comparing these portions to benchmark image data. The benchmark image data can include one or more fiducial markers 350 that can be used as a point of reference or a measure in analysis of the image data. Fiducial markers may be either something present and/or placed in the field of view of the vision sensors at a known distance from the vision sensors and/or one or more marks in the reticles of one or more of the vision sensors. Additionally or alternatively, a fiducial marker can be a feature present on or otherwise associated with the pathway in a field of view of the vision sensors having known distances and dimensions. For example, the processors can perform a calibration based on detecting a feature of interest in the pathway (e.g., railway track tie separation, dimensions associated with traffic control features, etc.) The processors can calibrate a process for determining the range of vision based on one or more of a fiducial marker and/or a human visual parameter (e.g., what a human with 20/20 vision would see based on the image data, etc.). For example, the processors can perform a calibration for the vehicle to account for differences in views based on locations of the vision sensors on the vehicle. For example, the processors can perform the calibration prior to a trip of the vehicle or periodically during operation of the vehicle on the vehicle network.

In one example, an AI neural network may examine the image data obtained by one or more of the vision sensors. The AI neural network may include artificial neurons arranged in layers and connected with each other by connections. The AI neural network may perform calibration for the vehicle to account for differences in views based on locations of the vison sensors, weather conditions, vehicle state information, or the like. The AI neural network may calculate a stopping distance based on the image data obtained and evaluated. The AI neural network may receive feedback regarding the stopping distance that may be calculated by the artificial neurons. The AI neural network may be trained by changing one or more connections between the artificial neurons in the AI neural network based on the feedback, as discussed further below.

Image data representing one or more fiducial markers can be contained in benchmark visual profiles from among several such profiles stored in a computer readable memory, such as an image data memory 118. The memory may include and/or represent one or more memory devices, such as a computer hard drive, a CD-ROM, DVD ROM, a removable flash memory card, a magnetic tape, or the like. The memory can store image data obtained by the vision sensors and the benchmark visual profiles associated with the vehicle and/or trips of the vehicle.

Based on similarities or differences between one or more vision sensor-obtained image data and the benchmark image data, the processors and/or the AI neural network can determine the stopping distance of the vehicle on the segment of the pathway captured by the vision sensors. Alternatively, the processors can convert the image data to or generate the image data as wireframe model data. The wireframe model data can be used to identify the location, shape, or the like, of the pathway to determine the stopping distance of the vehicle on the segment of the pathway. The processors and/or the AI neural network can determine a range of vision from the vehicle based on the image data and determine the stopping distance and/or the speed limit based on the range of vision. Based on the stopping distance, the processors and/or the AI neural network can determine a moving speed of the vehicle and a speed limit of the vehicle. Additionally or alternatively, the moving speed of the vehicle can be measured by separate sensors (e.g., accelerometers and the like). The speed limit can be determined based on the stopping distance and/or the range of vision determined from the image data. The speed limit can also be determined based on one or more of a distance to one or more objects present in the pathway (e.g., stationary or moving objects), one or more other vehicles, a state of a traffic signaling device 340, vehicle consist data associated with the vehicle, a sensed condition of the vehicle, a sensed condition of a pathway, weather conditions, or pathway data associated with a vehicle control network communicated by one or more wayside controllers. The processors and/or AI neural network can generate a signal to control movement of the vehicle based on a difference between the moving speed and a speed limit of the vehicle. The signal generated by the processors and/or the AI neural network can be used to restrict the moving speed of the vehicle to an upper speed limit associated with a pathway responsive to the speed limit determined from the image data exceeding the upper speed limit.

Figure 2:
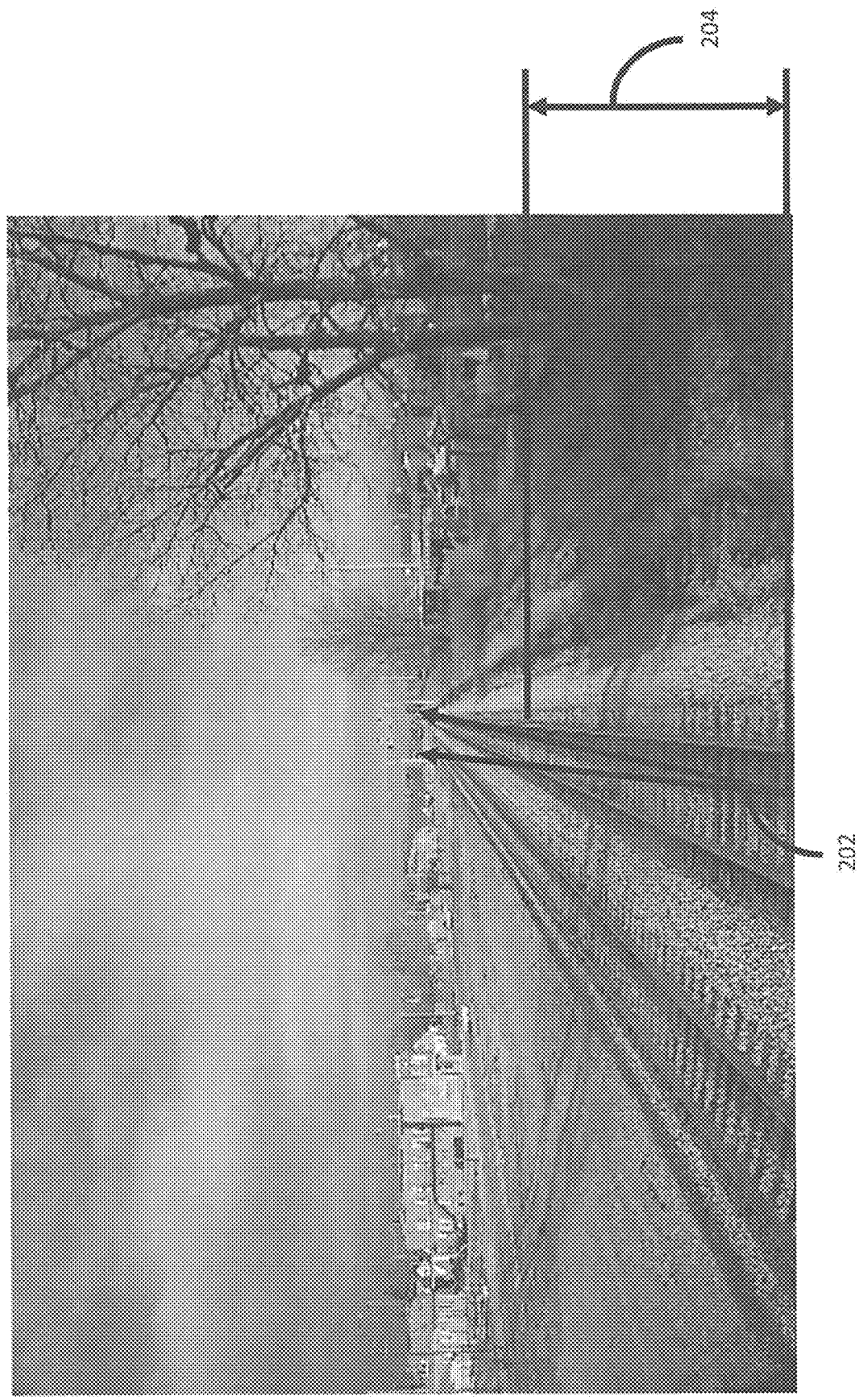
FIG. 2 illustrates one example of image data of the pathway obtained by one or more vision sensors of the vehicle of FIG. 1.
Figure 3:
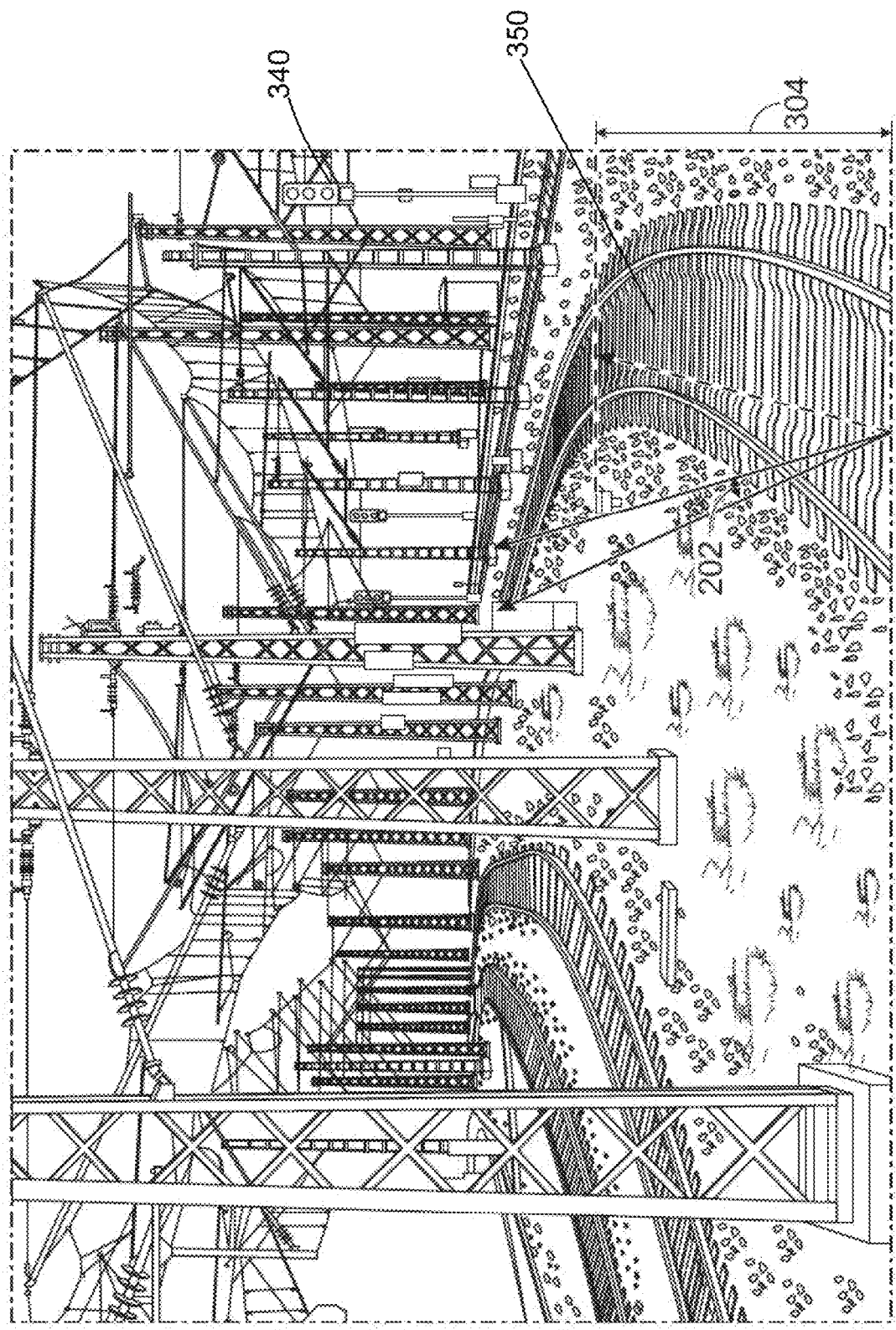
FIG. 3 illustrates another example of image data of the pathway obtained by one or more vision sensors of the vehicle of FIG. 1.

FIGS. 2 and 3 illustrate examples of image data of the pathway obtained by one or more vision sensors of the vehicle of FIG. 1. FIG. 2 illustrates a straight pathway having a range of vision indicated by the arrows 202. FIG. 3 represents a curved pathway having a range of vision indicated by the arrows 302. The vision sensors may obtain image data of the pathway. Based on receiving the image data, the processors may examine the image data and may determine the distance to the vanishing point of the pathway. The vanishing point of the pathway can be determined using known techniques (e.g., triangulation, etc.) and dimensions based on previous and/or concurrent calibration with a fiducial marker. The processors can calculate stopping distance 204, 304 as a fraction of the distance to the vanishing point of the pathway. The processors can also determine a speed limit of the vehicle based on the required and/or desired stopping distance. The speed limit can also be determined based on one or more of a distance to one or more other objects present on the pathway (e.g., stationary or moving objects), vehicles present on the pathway, a state of a traffic signaling device, vehicle consist data associated with the vehicle, a sensed condition of the vehicle, a sensed condition of the pathway, a weather condition, or pathway data associated with a vehicle control network communicated by one or more wayside controllers. The processors can generate a signal to control movement of the vehicle based on a difference between the moving speed and a speed limit of the vehicle. The signal generated by the processors can be used to restrict the moving speed of the vehicle to an upper speed limit associated with a pathway and/or the vehicle responsive to the speed limit determined from the image data exceeding the upper speed limit. For example, the onboard controller can implement a speed limit to stop the vehicle within a preselected stopping distance may be implemented. In an additional or alternative example, based on the speed limit of the vehicle exceeding an upper speed limit associated with one or more segments of the pathway of a vehicle network, the onboard controller can implement the upper speed limit associated with the pathway (or segments thereof). In an additional or alternative example, the onboard controller can implement a speed limit based on stopping distance for a vehicle to safely stop. The stopping distance may be set by an authority, set by a user of the vehicle, or the like. Additionally or alternatively, the stopping distance may be a distance required to safely stop relative to one or more objects and/or one or more vehicles on the pathway. For example, the stopping distance and corresponding speed limits may have higher values for straight pathways having relatively far range of view, but may have lower values based on pathways having curves, hills, or the like having relatively shorter ranges of view. Other environmental factors that can reduce a range of view and, accordingly, the speed limit of the vehicle can include limited light conditions (e.g., dusk, night, overcast weather conditions, etc.), smoke, fog, and the like. In one example (e.g., FIG. 2), the range of vision may be calculated to be 500 feet for a straight pathway. Based on a stopping distance of ½ of the range of vision, the stopping distance may be 250 feet. Based on a stopping distance of 50 feet, the speed limit can be calculated to be 12 miles per hour. In another example (e.g., FIG. 3), the range of vision may be calculated to be 100 feet for a straight pathway. Based on a stopping distance of ½ of the range of vision, the stopping distance may be 50 feet. Based on a stopping distance of 50 feet, the speed limit can be calculated to be 5 miles per hour. Accordingly, the methods and systems herein enable implementation of dynamic speed control and/or management of vehicles based at least in part on the range of vision of vehicle operator and, optionally, factors such as one or more of geography, weather conditions, or vehicle state information (e.g., length, mass, height, consist, etc.).

Figure 4:
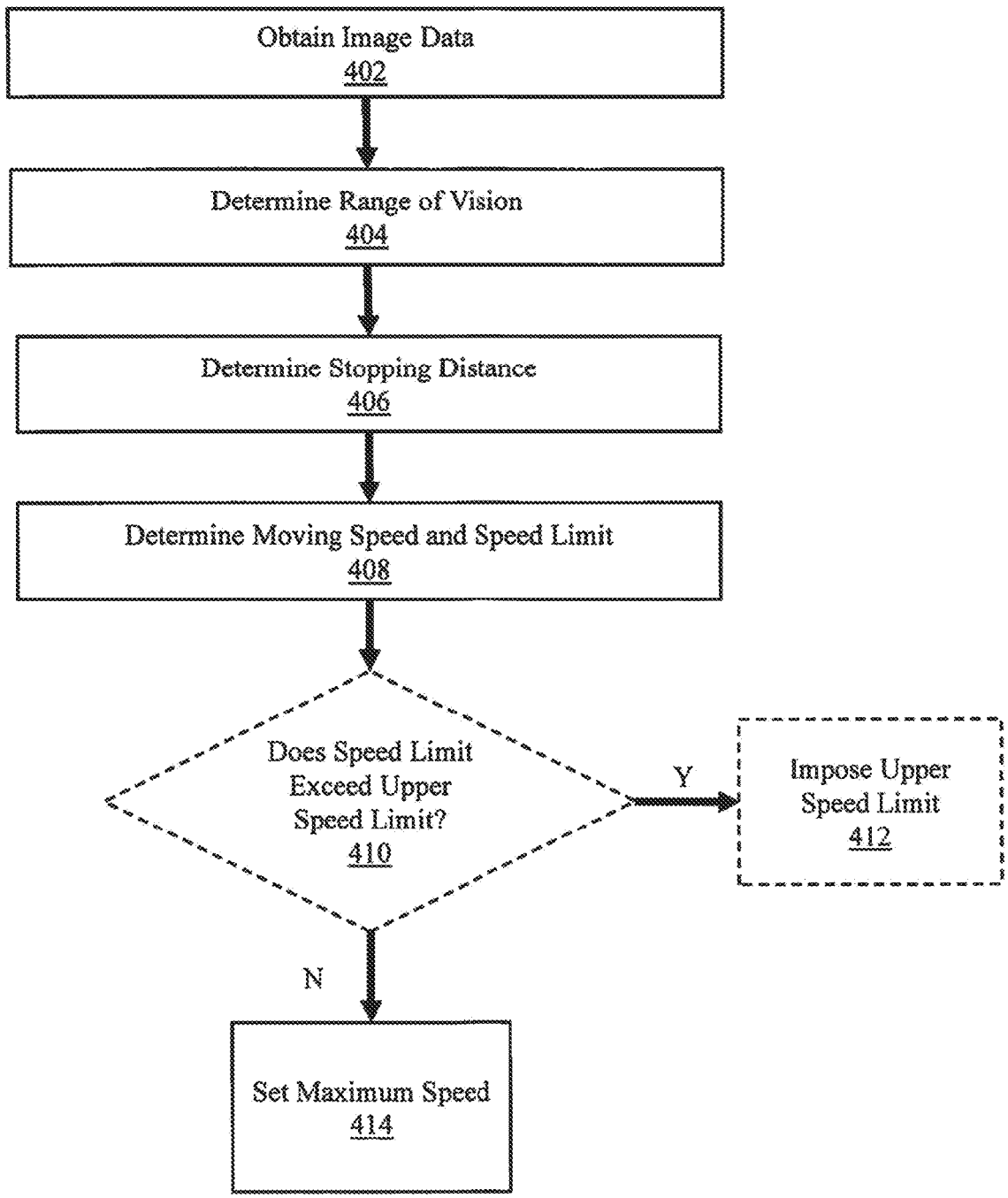
FIG. 4 illustrates an example method for managing a speed in accordance with one or more embodiments described herein.

FIG. 4 illustrates an example method for managing a speed in accordance with one or more embodiments described herein. The operations of FIG. 4 can be performed by one or more processors or an AI neural network in response to execution of program instructions, such as in applications stored in a storage medium implemented the onboard controller and/or other on-board computing devices. Optionally, all or a portion of the operations of FIG. 4 may be carried out without program instructions, such as in an image signal processor associated with the vision sensors that has the corresponding operations implemented in silicon gates and other hardware. It should be recognized that while the operations of method are described in a somewhat serial manner, one or more of the operations of method may be continuous and/or performed in parallel with one another and/or other operations of the onboard controller.

At 402, image data may be obtained from one or more vision sensors disposed onboard the vehicle. The image data can be obtained by one or more forward-facing vision sensors. For example, fields of view of the vision sensors may represent the space that may be captured in image data obtained by the vision sensors. The vision sensors may capture image data of the space in front of the vehicle, including the pathway. The vision sensors can obtain static (e.g., still) image data and/or moving image data (e.g., video). In one aspect, the processors examine the image data by identifying which portions of the image data represent the pathway. The image data can be compared to benchmark image data (e.g. representing one or more fiducial markers) in order to determine the distance between two or more objects of interest in the image data. Optionally, prior to and/or during operation of the vehicle, the method can include calibrating a process for determining the range of vision based on one or more of a fiducial marker and/or a human visual parameter.

Optionally, at 404, the one or more processors may determine a range of vision from the vehicle based at least in part on the image data. The range of vision can be determined based at least in part on determining a distance to a vanishing point of the pathway within the field of view of the one or more forward-facing vision sensors. For example, the distance to the vanishing point of the pathway from the vehicle may be determined by analyzing the image data to determine the vanishing point of one or more features of interest (e.g., the rails of the railway, traffic control markers on a pathway, etc.) and mathematical techniques (e.g., triangulation, quadrature, etc.) used to calculate the distance to the vanishing point. Additionally or alternatively, the range of vision may be based on one or more of a fiducial marker and/or a human visual parameter (e.g., 20/20 vision, etc.). The range of vision may be determined continuously and/or periodically. One or more values for range of vision may be combined (e.g., using an average, a mean, a median, a moving average, a moving mean, a moving median, etc.) or an estimated based on performing hysteresis over multiple range of vision values. Additionally or alternatively, a confidence level for the range of vision (or estimated range of vision) can be determined. A confidence level may be determined for the determined stopping distance, as well as the determined speed limit. The confidence levels may be based at least in part on the image data from the vehicle. The confidence levels may be based on other inputs, for example, historical image data, benchmark image data, fiducial markers, weather conditions, vehicle state information, or the like. Additionally or alternatively, the one or more processors can limit the magnitude of changes in the speed limit over time so that the variation in speed limit is held within a selected threshold. The range of vision of the vision sensors can be utilized to estimate the range of vision of a vehicle operator.

At 406, the one or more processors may determine a stopping distance of the vehicle based at least in part on the image data and the range of vision. The stopping distance can be determined based on the range of vision from the vehicle. The stopping distance can be a fraction of the range of vision of the vision sensors and/or estimated range of vision of the vehicle operator. For example, the stopping distance can be 50% of the range of vision of the vision sensors and/or estimated range of vision of the vehicle operator. Additionally or alternatively, the stopping distance can be determined based on two or more values of the range of vision.

At 408, the one or more processors may determine a moving speed of the vehicle and a speed limit of the vehicle. The speed limit can be determined based at least in part on one or more of the stopping distance and/or the range of vision that may be determined from the image data. For example, the speed limit can be determined to be the speed required to stop the vehicle within the stopping distance. Additionally, the speed limit may also account for one or more of the geography, the weather conditions, and the vehicle state information (e.g., length, mass, consist, etc.). Additionally or alternatively, the speed limit can be determined also based on one or more of a distance to one or more obstructions (which may be stationary or moving), a distance to one or more other vehicles, a state of a traffic signaling device, vehicle consist data associated with the vehicle, a sensed condition of the vehicle, a sensed condition of a pathway, or pathway data associated with a vehicle control network communicated by one or more wayside controllers. Optionally, the moving speed of the vehicle can be confirmed by referencing one or more additional speed sensors onboard the vehicle and/or operably coupled to the onboard controller. Additionally or alternatively, the moving speed can be obtained from speed sensors associated with the onboard controller. Optionally, at 410, based on the speed limit exceeding the upper speed limit, flow may move to 412. Optionally, at 410, based on the speed limit not exceeding the upper speed limit, flow may move to 414.

At 412 and 414, the one or more processors may control movement of the vehicle based on a difference between the moving speed of the vehicle and the speed limit of the vehicle. At 412, controlling the movement of the vehicle can include restricting the moving speed of the vehicle to an upper speed limit associated with a pathway responsive to the speed limit exceeding the upper speed limit. Additionally or alternatively, restricting the moving speed of the vehicle can include stopping the vehicle based on exceeding the speed limit and/or upper speed limit. Controlling movement of the vehicle can include comparing the range of vision to two or more historical values of range of vision and updating the speed limit based on the comparison.

Figure 5:
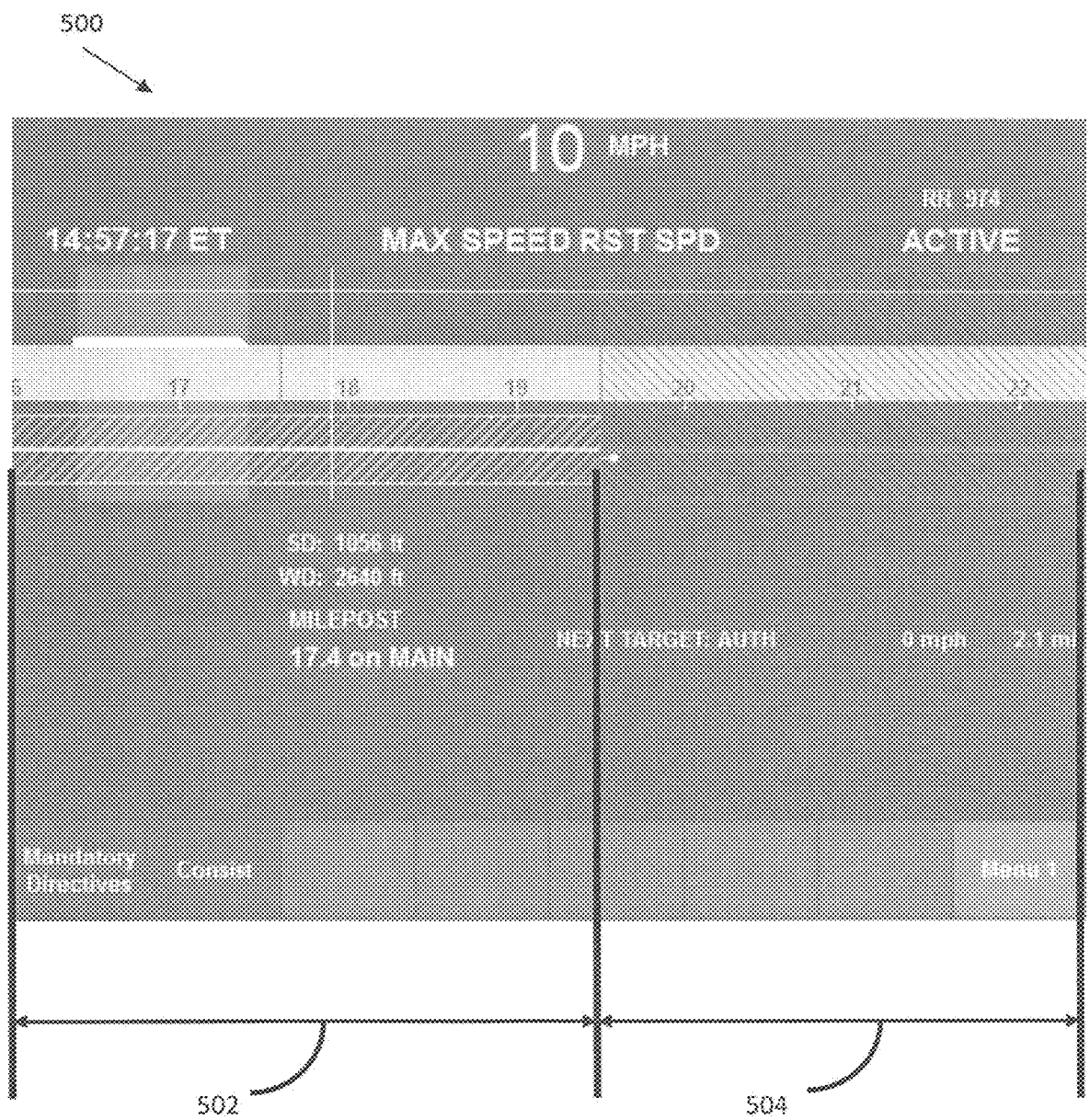
FIG. 5 illustrates an example of presentation of information on a graphical user interface in accordance with managing a speed in accordance with one or more embodiments herein.

FIG. 5 illustrates an example of presentation of information on a graphical user interface 500 in accordance with managing a speed in accordance with one or more embodiments herein. The vehicle associated with the graphical user interface can be operating under a maximum speed limit associated with one or more pathway segments on a vehicle network. The pathway may be represented by first and second pathway segments 502 and 504, respectively. The speed limit of the first segment of the pathway could change as the vehicle moves within the range of first pathway segment based on the range of vision (or estimated range of vision) of the crew. In some examples, the onboard controller may continuously and/or periodically determine the range of vision and update the range of vision based on changes in the range of vision that are above a threshold change and/or occur for a threshold time period. The displayed speed limit can be indicated to be a restricted speed value. For example, the graphical user interface may display the restricted speed value and indicate that the vehicle network is implementing a maximum restricted speed on one or more segments of the pathway on which the vehicle is traveling. The speed limit can be dynamic and based on the specific vehicle. Additionally or alternatively, the vehicle network may implement a stop target on the second segment for the vehicle. The onboard controller can implement stopping the vehicle upon encountering the second segment.

Figure 6:
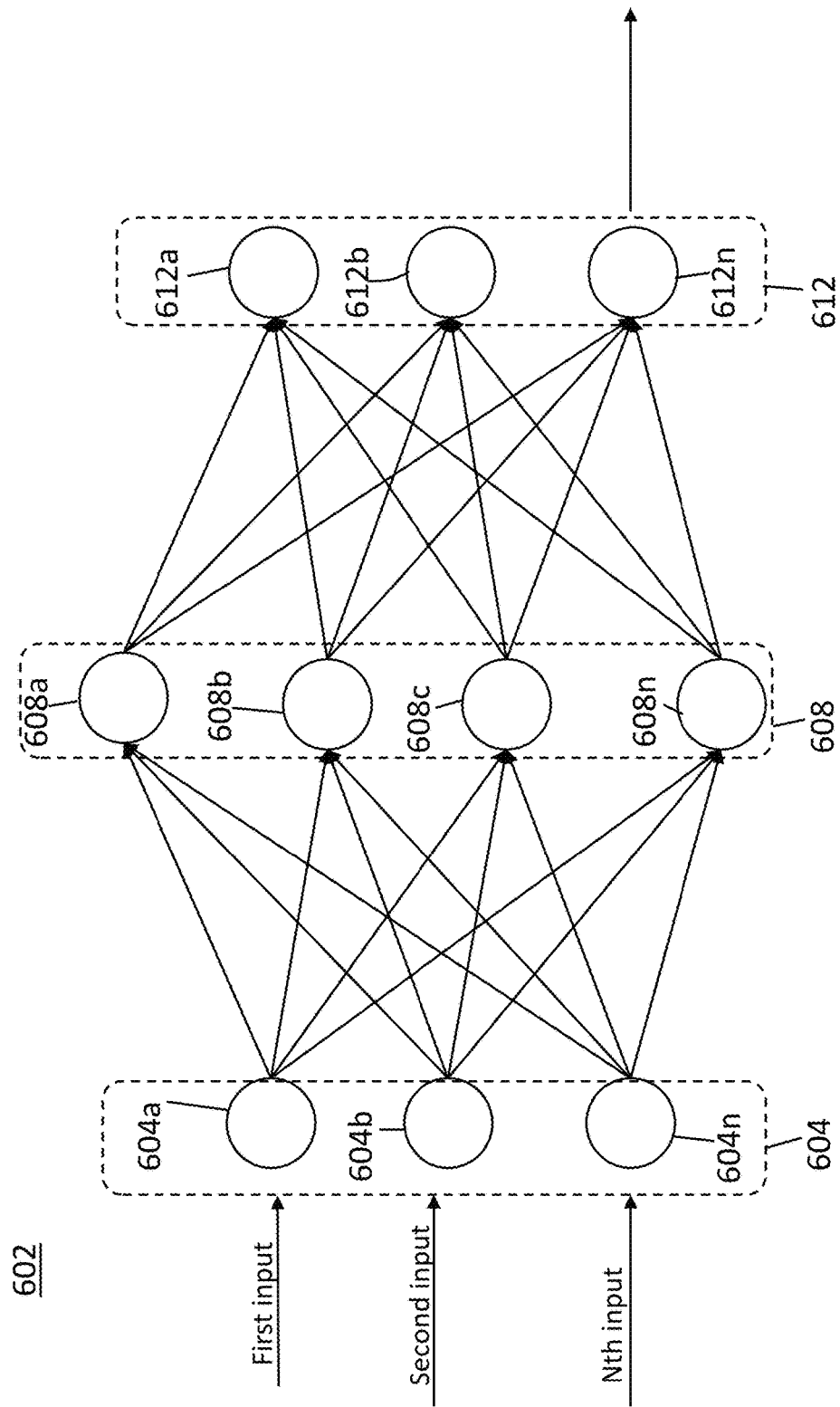
FIG. 6 illustrates a functional block diagram of an example neural network that can be used by a vehicle speed management system, according to one example.

As previously stated, one or more of the vehicle control systems described herein may be implemented in an AI or machine-learning system. FIG. 6 illustrates a functional block diagram of an example neural network 602 that can be used by a vehicle speed management system, according to one example. The vehicle speed management system may review various inputs, described above, for example the image data from the one or more vision sensors, benchmark image data, fiducial markers, geography, weather conditions, vehicle state information, or the like. In one example, the neural network can represent a long short-term memory (LSTM) neural network. In one example, the neural network can represent one or more recurrent neural networks (RNN). The neural network may be used to implement the machine learning as described herein, and various implementations may use other types of machine learning networks. The neural network may include an input layer 604, one or more intermediate or hidden layers 608, and an output layer 612. Each layer includes artificial individual units, or neurons. Each neuron can receive information (e.g., as input into the neural network or as received as output from another neuron in another layer or the same layer), process this information to generate output, and provide the output to another neuron or as output of the neural network. The input layer may include several input neurons 604a, 604b . . . 604n. The hidden layer may include several intermediate neurons 608a, 608b . . . 608n. The output layer may include several output neurons outputs 612a, 612b . . . 612n. The inputs may include, for example, the image data from the vision sensors, benchmark image data, fiducial markers, weather conditions, or the like.

Each neuron can receive an input from another neuron and output a value to the corresponding output to another neuron (e.g., in the output layer or another layer). For example, the intermediate neuron 608a can receive an input from the input neuron 604a and output a value to the output neuron 612a. Each neuron may receive an output of a previous neuron as an input. For example, the intermediate neuron 608b may receive input from the input neuron 604b and the output neuron 612a. The outputs of the neurons may be fed forward to another neuron in the same or different intermediate layer.

The processing performed by the neurons may vary based on the neuron, but can include the application of the various rules or criteria described herein to partially or entirely decide one or more aspects of the vehicle speed management system, for example a stopping distance, a speed limit, a moving speed, or the like. The output of the application of the rule or criteria can be passed to another neuron as input to that neuron. One or more neurons in the intermediate and/or output layers can determine connections between one or more aspects of the vehicle speed management system, for example the stopping distance for a determined image data. As used herein, a "connection" may refer to a preferred operation of the vehicle speed management system based on the inputs, for example a preferred stopping distance and/or speed limit given the inputs. The preferred operation may be based on increasing performance, efficiency, safety, longevity, or a combination of any or all of these factors. The last output neuron 612n in the output layer may output a connection or no-connection decision. For example, the output from the neural network may be an that the stopping distance needs to be increased as a result of a given image data and route condition, for example. Although the input layer, the intermediate layer(s), and the output layer may be depicted as each including three artificial neurons, one or more of these layers may contain more or fewer artificial neurons. The neurons can include or apply one or more adjustable parameters, weights, rules, criteria, or the like, as described herein, to perform the processing by that neuron.

In various implementations, the layers of the neural network may include the same number of artificial neurons as each of the other layers of the neural network. For example, the image data, the benchmark image data, the fiducial markers, or the like may be processed to provide information to the input neurons 604a-604n. The output of the neural network may represent a connection or no-connection of the inputs to a given output. More specifically, the inputs can include historical vehicle and image data. The historical vehicle and image data can be provided to the neurons 608a-608n for analysis and matches between the historical vehicle and image data. The neurons 608a-608n, upon finding connections, may provide the potential connections as outputs to the output layer, which can determine a connection, no connection, or a probability of a connection.

In some embodiments, the neural network may be a convolutional neural network. The convolutional neural network can include an input layer, one or more hidden or intermediate layers, and an output layer. In a convolutional neural network, however, the output layer may include one fewer output neuron than the number of neurons in the intermediate layer(s), and each neuron may be connected to each output neuron. Additionally, each input neuron in the input layer may be connected to each neuron in the hidden or intermediate layer(s).

Such a neural network-based vehicle speed management system can be trained by operators, automatically self-trained by the vehicle speed management system itself, or can be trained both by operators and by the vehicle speed management system itself to improve how the system operates.

In one embodiment, controlling the movement of the vehicle can include restricting the moving speed of the vehicle to an upper speed limit associated with a pathway responsive to the speed limit determined from the image data exceeding the upper speed limit.

methods and systems can determine a range of vision from the vehicle based on the image data, wherein the speed limit may be determined also based on the range of vision.

The methods and systems can determine two or more values of the range of vision based on the image data, and may determine the stopping distance based on the two or more values of the range of vision.

The methods and systems can determine the speed limit also based on one or more of a distance to one or more obstructions, a distance to one or more other vehicles, a state of a traffic signaling device, vehicle consist data associated with the vehicle, a sensed condition of the vehicle, a sensed condition of a pathway, or pathway data associated with a vehicle control network communicated by one or more wayside controllers.

The methods and systems can determine a range of vision from the vehicle based on the image data, wherein the stopping distance may be determined based on the range of vision from the vehicle.

The methods and systems can include calibrating a process for determining the range of vision based on one or more of a fiducial marker or a human visual parameter.

The methods and systems can confirm the moving speed of the vehicle by referencing one or more additional speed sensors onboard the vehicle.

Controlling movement of the vehicle can include comparing the range of vision to two or more historical values of range of vision and updating the speed limit based on the comparison.

The methods and systems can include obtaining image data from one or more forward-facing vision sensors and determining the range of vision by determining a distance to a vanishing point of the pathway within a field of view of the one or more forward-facing vision sensors.

The one or more vision sensors include one or more forward-facing vision sensors and the onboard controller may determine the range of vision by determining a distance to a vanishing point of the pathway within a field of view of the one or more forward-facing vision sensors.

In one embodiment, a method is provided that may include obtaining image data from one or more vision sensors disposed onboard a vehicle. The method may determine a stopping distance of the vehicle based at least in part on the image data from the vehicle using an artificial intelligence (AI) neural network having artificial neurons arranged in layers and connected with each other by connections. The method may determine a moving speed of the vehicle and a speed limit of the vehicle using the AI neural network. The speed limit may be determined based on the stopping distance that may be determined from the image data from the vehicle. The method may include controlling movement of the vehicle using the AI neural network by enforcing one or more movement authorities preventing unwarranted movement of the vehicle into one or more pathways based on a difference between the moving speed of the vehicle and the speed limit of the vehicle. The method may include receiving feedback regarding the stopping distance and the speed limit that may be calculated by the artificial neurons. The method may include training the AI neural network by changing one or more connections between the artificial neurons in the AI neural network based on the feedback that may be received.

The method may include determining a confidence level of the stopping distance and the speed limit that is calculated by the AI neural network. The confidence level may be based at least in part on the image data from the vehicle and the feedback that is received. The method may include determining a range of vision from the vehicle based on the image data using the AI neural network. The speed limit may be determined also based on the range of vision.

The speed limit may be determined by the AI neural network based on one or more of a distance to one or more obstructions, a distance to one or more other vehicles, or a weather condition. The AI neural network may determine a range of vision from the vehicle based on the image data. The stopping distance may be determined based on the range of vision from the vehicle. Two or more values of the range of vision may be determined based on the image data using the AI neural network. The stopping distance may be determined based on the two or more values of the range of vision.

The method may include a calibrating process for determining the range of vision based on a fiducial marker using the AI neural network. In one example, controlling movement of the vehicle may include the AI neural network comparing the range of vision to two or more historical values of range of vision and updating the speed limit based on a comparison of the range of vision to the two or more historical values of range of vision. The method may include obtaining image data from one or more forward-facing vision sensors and determining the range of vision by determining a distance to a vanishing point of the one or more pathways within a field of view of the one or more forward-facing vision sensors using the AI neural network. The moving speed of the vehicle may be confirmed by referencing one or more additional sensors onboard the vehicle.

In one embodiment, a system is provided that may include includes one or more vision sensors disposed onboard a vehicle and an AI neural network having artificial neurons arranged in layers and connected with each other by connections. The AI neural network may obtain image data from the one or more vision sensors and may determine a stopping distance of the vehicle based at least in part on the image data from the vehicle. The AI neural network may determine a moving speed of the vehicle and a speed limit of the vehicle. The speed limit may be determined based on the stopping distance that is determined by the AI neural network from the image data from the vehicle. The AI neural network may control movement of the vehicle by enforcing one or more movement authorities preventing unwarranted movement of the vehicle into one or more pathways based on a difference between the moving speed of the vehicle and the speed limit of the vehicle. The AI neural network may receive feedback regarding the stopping distance that may be calculated by the artificial neurons. The AI neural network may be trained by changing one or more connections between the artificial neurons in the AI neural network based on the feedback that may be received.

The AI neural network may control the movement of the vehicle and may restrict the moving speed of the vehicle to an upper speed limit associated with the one or more pathways responsive to the speed limit determined from the image data exceeding the upper speed limit. The AI neural network may determine a range of vision from the vehicle based on the image data and the speed limit may be determined based on the range of vision. The speed limit may be determined based on one or more of a distance to one or more other vehicles, a state of a traffic signaling device, vehicle consist data associated with the vehicle, or a weather condition.

The AI neural network may determine a range of vision from the vehicle based on the image data. The stopping distance may be determined based on the range of vision from the vehicle. The AI neural network may determine two or more values of the range of vision based on the image data and the stopping distance may be determined based on the two or more values of the range of vision. The AI neural network may calibrate a process for determining the range of vision based on a fiducial marker.

The one or more vision sensors may include one or more forward-facing vision sensors. The AI neural network may determine the range of vision by determining a distance to a vanishing point of the one or more pathways within a field of view of the one or more forward-facing vision sensors.

In one embodiment, a method is provided that may include obtaining image data from one or more vision sensors disposed onboard a vehicle. The one or more vision sensors may include one or more forward-facing vision sensors. The method may include determining a range of vision from the vehicle based at least in part on the image data using an AI neural network having artificial neurons arranged in layers and connected with each other by connections. The method may include determining a stopping distance of the vehicle based at least in part on the image data from the vehicle and the range of vision using the AI neural network. The method may include determining a moving speed of the vehicle and a speed limit of the vehicle using the AI neural network. The speed limit may be determined based on the stopping distance and the range of vision that are determined from the image data from the vehicle. The method may include controlling movement of the vehicle using the AI neural network by enforcing one or more movement authorities preventing unwarranted movement of the vehicle into one or more pathways based on a difference between the moving speed of the vehicle and the speed limit of the vehicle. The method may include receiving feedback regarding the stopping distance and the speed limit that may be calculated by the artificial neurons. The method may include training the AI neural network by changing one or more connections between the artificial neurons in the AI neural network based on the feedback that may be received.

The AI neural network may control the movement of the vehicle and may restrict the moving speed of the vehicle to an upper speed limit associated with the one or more pathways responsive to the speed limit determined from the image data exceeding the upper speed limit.

In one embodiment, the controller may have a local data collection system deployed that may use machine learning to enable derivation-based learning outcomes. The controller may learn from and make decisions on a set of data (including data provided by the various sensors), by making data-driven predictions and adapting according to the set of data. In embodiments, machine learning may involve performing a plurality of machine learning tasks by machine learning systems, such as supervised learning, unsupervised learning, and reinforcement learning. Supervised learning may include presenting a set of example inputs and desired outputs to the machine learning systems. Unsupervised learning may include the learning algorithm structuring its input by methods such as pattern detection and/or feature learning. Reinforcement learning may include the machine learning systems performing in a dynamic environment and then providing feedback about correct and incorrect decisions. In examples, machine learning may include a plurality of other tasks based on an output of the machine learning system. In examples, the tasks may be machine learning problems such as classification, regression, clustering, density estimation, dimensionality reduction, anomaly detection, and the like. In examples, machine learning may include a plurality of mathematical and statistical techniques. In examples, the many types of machine learning algorithms may include decision tree based learning, association rule learning, deep learning, artificial neural networks, genetic learning algorithms, inductive logic programming, support vector machines (SVMs), Bayesian network, reinforcement learning, representation learning, rule-based machine learning, sparse dictionary learning, similarity and metric learning, learning classifier systems (LCS), logistic regression, random forest, K-Means, gradient boost, K-nearest neighbors (KNN), a priori algorithms, and the like. In embodiments, certain machine learning algorithms may be used (e.g., for solving both constrained and unconstrained optimization problems that may be based on natural selection). In an example, the algorithm may be used to address problems of mixed integer programming, where some components restricted to being integer-valued. Algorithms and machine learning techniques and systems may be used in computational intelligence systems, computer vision, Natural Language Processing (NLP), recommender systems, reinforcement learning, building graphical models, and the like. In an example, machine learning may be used for vehicle performance and behavior analytics, and the like.

In one embodiment, the controller may include a policy engine that may apply one or more policies. These policies may be based at least in part on characteristics of a given item of equipment or environment. With respect to control policies, a neural network can receive input of a number of environmental and task-related parameters. These parameters may include an identification route characteristics for a determined trip plan for a vehicle group, data from various sensors, and location and/or position data. The neural network can be trained to generate an output based on these inputs, with the output representing an action or sequence of actions that the vehicle group should take to accomplish desired speed and safety outcomes for the trip. During operation of one embodiment, a determination can occur by processing the inputs through the parameters of the neural network to generate a value at the output node designating that action as the desired action. This action may translate into a signal that causes the vehicle to operate at a given speed. This may be accomplished via back-propagation, feed forward processes, closed loop feedback, or open loop feedback. Alternatively, rather than using backpropagation, the machine learning system of the controller may use evolution strategies techniques to tune various parameters of the artificial neural network. The controller may use neural network architectures with functions that may not always be solvable using backpropagation, for example functions that are non-convex. In one embodiment, the neural network has a set of parameters representing weights of its node connections. A number of copies of this network are generated and then different adjustments to the parameters are made, and simulations are done. Once the output from the various models are obtained, they may be evaluated on their performance using a determined success metric. The best model is selected, and the vehicle controller executes that plan to achieve the desired input data to mirror the predicted best outcome scenario. Additionally, the success metric may be a combination of the optimized outcomes, which may be weighed relative to each other.

The controller can use this artificial intelligence or machine learning to receive input (e.g., image data or changes in image data), use a model that associates the image data with different operating speeds to select an operating speed of the one or more functional devices of the vehicle, and then provide an output (e.g., the operating speed selected using the model). The controller may receive additional input of the change in operating speed that was selected, such as analysis of noise or interference in communication signals (or a lack thereof), operator input, or the like, that indicates whether the machine-selected operating mode provided a desirable outcome or not. Based on this additional input, the controller can change the model, such as by changing which operating speed would be selected when similar or identical image data may be received the next time or iteration. The controller can then use the changed or updated model again to select an operating speed, receive feedback on the selected operating speed, change or update the model again, etc., in additional iterations to repeatedly improve or change the model using artificial intelligence or machine learning.

As used herein, the terms "processor" and "computer," and related terms, e.g., "processing device," "computing device," and "controller" may be not limited to just those integrated circuits referred to in the art as a computer, but refer to a microcontroller, a microcomputer, a programmable logic controller (PLC), field programmable gate array, and application specific integrated circuit, and other programmable circuits. Suitable memory may include, for example, a computer-readable medium. A computer-readable medium may be, for example, a random-access memory (RAM), a computer-readable non-volatile medium, such as a flash memory. The term "non-transitory computer-readable media" represents a tangible computer-based device implemented for short-term and long-term storage of information, such as, computer-readable instructions, data structures, program modules and sub-modules, or other data in any device. Therefore, the methods described herein may be encoded as executable instructions embodied in a tangible, non-transitory, computer-readable medium, including, without limitation, a storage device and/or a memory device. Such instructions, when executed by a processor, cause the processor to perform at least a portion of the methods described herein. As such, the term includes tangible, computer-readable media, including, without limitation, non-transitory computer storage devices, including without limitation, volatile and non-volatile media, and removable and non-removable media such as firmware, physical and virtual storage, CD-ROMS, DVDs, and other digital sources, such as a network or the Internet.

As used herein, an element or step recited in the singular and proceeded with the word "a" or "an" do not exclude the plural of said elements or operations, unless such exclusion is explicitly stated. Furthermore, references to "one embodiment" of the invention do not exclude the existence of additional embodiments that incorporate the recited features. Moreover, unless explicitly stated to the contrary, embodiments "comprising," "comprises," "including," "includes," "having," or "has" an element or a plurality of elements having a particular property may include additional such elements not having that property. In the appended claims, the terms "including" and "in which" are used as the plain-English equivalents of the respective terms "comprising" and "wherein." Moreover, in the following clauses, the terms "first," "second," and "third," etc. are used merely as labels, and do not impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function devoid of further structure.

The above description is illustrative, and not restrictive. For example, the above-described embodiments (and/or aspects thereof) may be used in combination with each other. In addition, many modifications may be made to adapt a particular situation or material to the teachings of the inventive subject matter without departing from its scope. While the dimensions and types of materials described herein define the parameters of the inventive subject matter, they are exemplary embodiments. Other embodiments will be apparent to one of ordinary skill in the art upon reviewing the above description. The scope of the inventive subject matter should, therefore, be determined with reference to the appended claims, along with the full scope of equivalents to which such clauses are entitled.

This written description uses examples to disclose several embodiments of the inventive subject matter, including the best mode, and to enable one of ordinary skill in the art to practice the embodiments of inventive subject matter, including making and using any devices or systems and performing any incorporated methods. The patentable scope of the inventive subject matter is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:

1. A method, comprising:
   obtaining image data from one or more vision sensors disposed onboard a vehicle;
   determining a stopping distance of the vehicle based at least in part on the image data from the vehicle using an artificial intelligence (AI) neural network having artificial neurons arranged in layers and connected with each other by connections;
   determining a moving speed of the vehicle and a speed limit of the vehicle using the AI neural network, the speed limit determined based on the stopping distance that is determined from the image data from the vehicle; and
   controlling movement of the vehicle using the AI neural network by enforcing one or more movement authorities preventing unwarranted movement of the vehicle into one or more pathways based on a difference between the moving speed of the vehicle and the speed limit of the vehicle,
   receiving feedback regarding the stopping distance and the speed limit that is calculated by the artificial neurons,
   training the AI neural network by changing one or more connections between the artificial neurons in the AI neural network based on the feedback that is received.

2. The method of claim 1, further comprising determining a confidence level of the stopping distance and the speed limit that is calculated by the AI neural network, the confidence level based at least in part on the image data from the vehicle and the feedback that is received.

3. The method of claim 1, further comprising determining a range of vision from the vehicle based on the image data using the AI neural network, wherein the speed limit is determined also based on the range of vision.

4. The method of claim 1, wherein the speed limit is determined by the AI neural network based on one or more of a distance to one or more obstructions, a distance to one or more other vehicles, or a weather condition.

5. The method of claim 1, further comprising determining a range of vision from the vehicle based on the image data using the AI neural network, wherein the stopping distance is determined based on the range of vision from the vehicle.

6. The method of claim 5, wherein two or more values of the range of vision are determined based on the image data using the AI neural network, wherein the stopping distance is determined based on the two or more values of the range of vision.

7. The method of claim 5, further comprising calibrating a process for determining the range of vision based on a fiducial marker using the AI neural network.

8. The method of claim 5, wherein controlling movement of the vehicle further comprises the AI neural network comparing the range of vision to two or more historical values of range of vision and updating the speed limit based on a comparison of the range of vision to the two or more historical values of range of vision.

9. The method of claim 5, further comprising obtaining image data from one or more forward-facing vision sensors and determining the range of vision by determining a distance to a vanishing point of the one or more pathways within a field of view of the one or more forward-facing vision sensors using the AI neural network.

10. The method of claim 1, wherein the moving speed of the vehicle is confirmed by referencing one or more additional speed sensors onboard the vehicle.

11. A system, comprising:
    one or more vision sensors disposed onboard a vehicle; and
    an artificial intelligence (AI) neural network having artificial neurons arranged in layers and connected with each other by connections, the AI neural network configured to obtain image data from the one or more vision sensors,
    the AI neural network configured to determine a stopping distance of the vehicle based at least in part on the image data from the vehicle,
    the AI neural network configured to determine a moving speed of the vehicle and a speed limit of the vehicle, the speed limit determined based on the stopping distance that is determined by the AI neural network from the image data from the vehicle, the AI neural network configured to control movement of the vehicle by enforcing one or more movement authorities preventing unwarranted movement of the vehicle into one or more pathways based on a difference between the moving speed of the vehicle and the speed limit of the vehicle, the AI neural network configured to receive feedback regarding the stopping distance that is calculated by the artificial neurons, the AI neural network configured to be trained by changing one or more connections between the artificial neurons in the AI neural network based on the feedback that is received.

12. The system of claim 11, wherein the AI neural network controlling the movement of the vehicle further comprises restricting the moving speed of the vehicle to an upper speed limit associated with the one or more pathways responsive to the speed limit determined from the image data exceeding the upper speed limit.

13. The system of claim 11, wherein the AI neural network is further configured to determine a range of vision from the vehicle based on the image data, wherein the speed limit is determined also based on the range of vision.

14. The system of claim 11, wherein the speed limit is also determined based on one or more of a distance to one or more other vehicles, a state of a traffic signaling device, vehicle consist data associated with the vehicle, or a weather condition.

15. The system of claim 11, wherein the AI neural network is further configured to determine a range of vision from the vehicle based on the image data, wherein the stopping distance is determined based on the range of vision from the vehicle.

16. The system of claim 15, wherein the AI neural network is further configured to determine two or more values of the range of vision based on the image data, wherein the stopping distance is determined based on the two or more values of the range of vision.

17. The system of claim 15, wherein the AI neural network is further configured to calibrate a process for determining the range of vision based on a fiducial marker.

18. The system of claim 17, wherein the one or more vision sensors include one or more forward-facing vision sensors and the AI neural network is configured to determine the range of vision by determining a distance to a vanishing point of the one or more pathways within a field of view of the one or more forward-facing vision sensors.

19. A method, comprising:
obtaining image data from one or more vision sensors disposed onboard a vehicle, wherein the one or more vision sensors include one or more forward-facing vision sensors;

determining a range of vision from the vehicle based at least in part on the image data using an artificial intelligence (AI) neural network having artificial neurons arranged in layers and connected with each other by connections;

determining a stopping distance of the vehicle based at least in part on the image data from the vehicle and the range of vision using the AI neural network;

determining a moving speed of the vehicle and a speed limit of the vehicle using the AI neural network, the speed limit determined based on the stopping distance and the range of vision that are determined from the image data from the vehicle; and controlling movement of the vehicle using the AI neural network by enforcing one or more movement authorities preventing unwarranted movement of the vehicle into one or more pathways based on a difference between the moving speed of the vehicle and the speed limit of the vehicle, receiving feedback regarding the stopping distance and the speed limit that is calculated by the artificial neurons, training the AI neural network by changing one or more connections between the artificial neurons in the AI neural network based on the feedback that is received.

20. The method of claim 19, wherein the AI neural network controlling the movement of the vehicle further comprises restricting the moving speed of the vehicle to an upper speed limit associated with the one or more pathways responsive to the speed limit determined from the image data exceeding the upper speed limit.

* * * * *